(12) United States Patent
Rajaraman et al.

(10) Patent No.: US 12,447,471 B2
(45) Date of Patent: Oct. 21, 2025

(54) THREE-DIMENSIONAL MICROELECTRODE ARRAY HAVING ELECTRICAL AND MICROFLUIDIC INTERROGATION OF ELECTROGENIC CELL CONSTRUCTS

(71) Applicants: University of Central Florida Research Foundation, Inc., Orlando, FL (US); The Administrators of the Tulane Educational Fund, New Orleans, LA (US)

(72) Inventors: Swaminathan Rajaraman, Winter Park, FL (US); Michael J. Moore, New Orleans, LA (US); Charles M. Didier, Dunedin, FL (US); Julia Freitas Orrico, Orlando, FL (US)

(73) Assignees: UNIVERSITY OF CENTRAL FLORIDA RESEARCH FOUNDATION, INC., Orlando, FL (US); THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 737 days.

(21) Appl. No.: 17/805,478

(22) Filed: Jun. 6, 2022

(65) Prior Publication Data
US 2022/0401955 A1 Dec. 22, 2022

Related U.S. Application Data

(60) Provisional application No. 63/210,539, filed on Jun. 15, 2021.

(51) Int. Cl.
B01L 3/00 (2006.01)

(52) U.S. Cl.
CPC . *B01L 3/502715* (2013.01); *B01L 2300/0636* (2013.01); *B01L 2300/0672* (2013.01)

(58) Field of Classification Search
CPC ....... B01L 3/502715; B01L 2300/0636; B01L 2300/0672; B01L 3/5085; B01L 2300/0645; B01L 3/502761; B01L 2300/0874
See application file for complete search history.

(56) References Cited

U.S. PATENT DOCUMENTS

| 2018/0224421 A1* | 8/2018 | Petcavich | ............ | G01N 33/502 |
| 2019/0162688 A1* | 5/2019 | Rajaraman | ............ | C12M 41/46 |

(Continued)

OTHER PUBLICATIONS

Kramer et al., "Modeling Chemotherapy-Induced Peripheral Neuropathy Using a Nerve-on-a-Chip Microphysiological System," ALTEX, 37(3); May 2020; pp. 350-364.

(Continued)

*Primary Examiner* — Brian J. Sines
(74) *Attorney, Agent, or Firm* — ALLEN, DYER, DOPPELT + GILCHRIST, P.A.

(57) ABSTRACT

A three-dimensional (3D) microelectrode array for in vitro electrical and microfluidic interrogation of electrogenic cell constructs includes a substrate having a plurality of micro vias. A hypodermic microneedle is received within each micro via of a first subgroup of the plurality of micro vias and each has a length that exceeds the thickness of the substrate to form a hypodermic microneedle array on the top face of the substrate. Metallic traces are formed on the bottom face and interconnect the hypodermic microneedles. A culturing area is formed in the top face.

21 Claims, 9 Drawing Sheets

(56) References Cited

U.S. PATENT DOCUMENTS

2021/0139828 A1* 5/2021 Soscia ............... C12M 23/12
2022/0031209 A1* 2/2022 Windmiller ........ A61B 5/14532

OTHER PUBLICATIONS

Hart et al., "Biocompatibility of Blank, Post-Processed and Coated 3D Printed Resin Structures with Electrogenic Cells," MDPI Biosensors; 2020; 10, 152; pp. 1-14.

Lashkaripour et al., "Desktop Micromilled Microfluidics," Microfluidics and Nanofluidics; 22:31; Feb. 26, 2018; pp. 1-13.

Pollard et al., "Comparative Analysis of Chemotherapy-Induced Peripheral Neuropathy in Bioengineered Sensory Nerve Tissue Distinguishes Mechanistic Differences in Early-Stage Vincristine-, Cisplatin-, and Paclitaxel-Induced Nerve Damage," Toxicological Sciences; 180(1); Jan. 7, 2021; pp. 76-88.

Sonmez et al., "Polycarbonate Heat Molding for Soft Lithography," Small; vol. 16; Document No. 2000241; Mar. 29, 2020; pp. 1-12.

Turska et al., "Liquid-Induced Crystallization of a Bisphenol-A Polycarbonate," Polymer; vol. 20; Jul. 1979; pp. 855-858.

* cited by examiner

POLYCARBONATE 20
MAGNET 32
Ti-Au METAL TRACES 40

CULTURE WELL 44
PDMS INSULATION LAYER 45
ELECTRON BEAM EVAPORATION 38

STAINLESS-STEEL MICRONEEDLES 30
MICRODRILL BIT 24
MICROFLUIDIC PORT 36

THREE-DIMENSIONAL MICROELECTRODE ARRAY HAVING ELECTRICAL AND MICROFLUIDIC INTERROGATION OF ELECTROGENIC CELL CONSTRUCTS

GOVERNMENT SPONSORSHIP

This project is currently supported by NIH Grants 1UG3TR003150-01 and 4UH3TR003150-02, and associated with University of Central Florida Account No. 63018A43.

PRIORITY APPLICATION(S)

This application is based upon provisional application Ser. No. 63/210,539, filed Jun. 15, 2021, the disclosure which is hereby incorporated by reference in its entirety.

FIELD OF THE INVENTION

The present invention relates to microelectrode arrays (MEAs) for in vitro electrophysiological applications and method of making.

BACKGROUND OF THE INVENTION

Microelectrode Arrays (MEAs) are devices that contain multiple microelectrodes through which voltage and current signals from electrically active cells are delivered and/or recorded, essentially serving as interfaces that connect neurons or other electrogenic cells to electronic circuitry. There are two general classes of MEAs: 1) in vitro (outside the body) and 2) in vivo (implantable).

There has been continued work on in vitro MEAs for use in conducting electrophysiological experiments on tissue slices, spheroids, hydrogel-3D cell aggregates or dissociated cell cultures. In these experiments, the field of in vitro biology has moved rapidly toward three-dimensional (3D) models because 3D models better capture in vivo-like behavior. "Organs-on-chips" or microphysiological systems have been identified as the most promising candidates for these types of improved preclinical signatures. However, there are no tools currently in the market to interface electrically with these microphysiological system, especially in a high-throughput format. There are also relatively few tools that present 3D electrodes in a single well construction. Conventional microelectrode array platforms, including high-throughput formats that use flat two-dimensional substrates and electrodes, are unable to capture physiologically relevant signals in three dimensions due to the low signal-to-noise ratio or a poor interface with the tissue-specific architecture corresponding to the three-dimensional microphysiological systems.

The sophistication of today's "organ-on-a-chip" in vitro biological models involving cell lines, organoids, spheroids and multi-aggregate cellular models are demanding three-dimensional microstructures and strategies for procuring multifarious data sets and long-term integration with these models. Three-dimensional microelectrode arrays have been established as the next generation interfaces to procure electrophysiological data sets in this rapidly growing field. The addition of transparency using glass or transparent polymer substrates may enhance procurement of simultaneous optical metrics in addition to electrical/electrophysiological measures. Toward assessing newer endpoints, the ability to locally and selectively stimulate separate electrogenic cellular populations becomes more important.

SUMMARY OF THE INVENTION

In general, a three-dimensional (3D) microelectrode array for in vitro electrical and microfluidic interrogation of electrogenic cell constructs may comprise a substrate having a top face and opposing bottom face, and a plurality of micro vias formed within the substrate and extending from the bottom face to the top face. A hypodermic microneedle may be received within each micro via of a first subgroup of the plurality of micro vias and may extend upward from the bottom face through the top face and may have a length that exceeds the thickness of the substrate to form a hypodermic microneedle array on the top face. Metallic traces may be formed on the bottom face and may interconnect the hypodermic microneedles. A culturing area may be formed in the top face.

Microtroughs may be formed on the bottom face and may interconnect the micro vias of the first subgroup, and may have conductive paste received therein forming a metallic trace pattern interconnecting the hypodermic microneedles. A plurality of hollow hypodermic microports may be received within a second subgroup of the plurality of micro vias and may extend upward from the bottom face and may form microfluidic ports. The hypodermic microneedles may comprise at least one of solid and hollow microneedles. The length of the hypodermic microneedles may be about 1.3 to 1.6 times greater than the thickness of the substrate.

In an example, the substrate may be about 500 μm to 5.0 mm in thickness. The height of the microneedle array may extend above the top face of the substrate by about 25 μm to 5 mm. The culturing area may comprise a ring of transparent polymer.

A method aspect is disclosed of forming a three-dimensional (3D) microelectrode array for in vitro electrical and microfluidic interrogation of electrogenic cell constructs. The method may comprise forming a substrate having a top face and opposing bottom face and forming a plurality of micro vias within the substrate from the bottom face to the top face. The method includes inserting a hypodermic microneedle within each micro via of a first subgroup of the plurality of micro vias and that extend upward from the bottom face through the top face and having a length that exceeds the thickness of the substrate to form a hypodermic microneedle array on the top face, forming metallic traces on the bottom face that interconnect the hypodermic microneedles, and forming a culturing area formed in the top face.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1A:
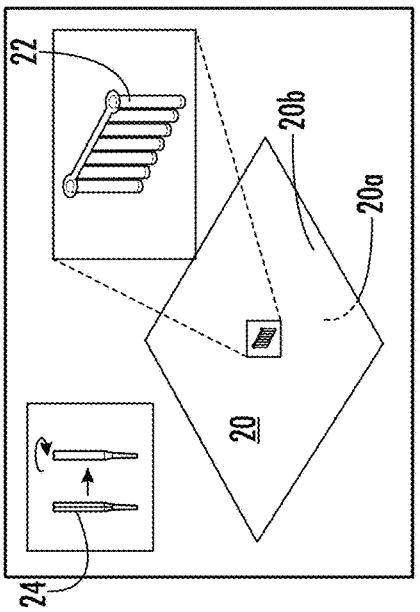
FIGS. 1A-1F show different views in the process of forming the three-dimensional microelectrode array according to the invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

A polymer and metal-based microfabricated three-dimensional (3D) microelectrode array includes tri-modal functionality to obtain simultaneous data sets of different electrical, optical and microfluidic markers from a variety of electrogenic cellular constructs. An example process for forming the 3D microelectrode array is explained below with reference to FIGS. 1A-1F. The 3D microelectrode array is a next generation interface to transduce multi-modal data sets from the burgeoning field of "organ-on-a-chip" in vitro modeling of biological functions. The microfabrication process is adaptable for low and high density 3D electrodes and microfluidic (μF) ports along with full spectrum impedance that permits the process to customize and control the 3D microelectrode size. The various materials and components used in the microfabrication process as explained below may be used for biological metrics using both a novel transparency assay and a biocompatibility assay with an electrogenic cell culture system. Rapid neuronal spheroid attachment to the 3D microfluidic ports of the tri-modal 3D microelectrode array has been demonstrated successfully.

The addition of 3D microfluidic ports to the 3D microelectrode arrays enables this added functionality. The tri-modal 3D microelectrode arrays may chemically stimulate an electrogenic cell population while recording electrical activity and observing optical markers, all simultaneously. These 3D microelectrode arrays may be used for the study of electrophysiology of complex biosystems with multiple endpoints in applications, such as for drug development and toxicity screening.

Advancements in desktop micromilling permits this technology to be an advantageous fabrication technique for prototyping in vitro 3D microstructures used for the 3D microelectrode arrays. Parameters of interest may be optimized to enhance feature definition in polymers because of decreased surface roughness and a standardization of minimum line widths, allowing accuracy and precision in the manufacture of the 3D microelectrode arrays.

A micromilling-based polymer microfabrication technology allows simple, rapid, scalable, customizable and cost-effective 3D microelectrode arrays having tri-modal functionalities for electrical, optical and microfluidic interrogation of electrogenic cell constructs. In addition to micromilling and associated microdrilling, the manufacture includes a microdrilling and magnetic insertion process that permits clean and well-defined microdrilled vias having a profile that retains optical transparency and allows manufacture of solid and hollow microneedles, i.e., 3D microelectrodes and 3D microfluidic ports, which can be used to achieve consistent electrode and microfluidic ports and use of magnetic assembly in the microdrilled vias. Polycarbonate may be used for the substrate due to its attractive properties, including resistance to cracking, and well-known biocompatibility with respect to many cell lines. Furthermore, elastomeric materials such as polydimethylsiloxane (PDMS) may be employed for the rapid fabrication of biointerfaces and provide a molding process in high aspect ratio geometries. This type of material (PDMS) may be used as an insulation layer and incorporated with the current 3D microelectrode arrays.

The tri-modal functionality of the electrical, optical and microfluidic was shown by developing a transparency assay using ultraviolet, visible spectroscopy having biocompatibility with HL-1 cardiomyocytes as a cardiac muscle cell line and rapid neuronal spheroid integration using the three-dimensional microfluidic ports and electrical measures from the developed 3D microelectrode arrays.

There now follows a description of the process development and integration of various components and explanation of the fabrication process for the tri-modal 3D microelectrode array with the process shown in FIGS. 1A-1F. The 3D microelectrode array, in a non-limiting example, may contain a 2 mm linear array with 6 electrodes of 220 μm diameter. This microelectrode array was initially designed using AutoCAD 2020 (Autodesk) on a 24 mm×24 mm chip size. A Drawing Interchange Format (DXF) file was imported into a T-Tech QC-J5 Quick Circuit Prototyping Systems (T-Tech) for microdrilling into a polycarbonate substrate illustrated at 20. As shown in FIG. 1A, the microdrilling produces vias 22 down to about 25 μm diameter with excellent tolerances, which may be produced using a precise spindle and microdrills 24 having a low runout. These dimensions can vary, of course, and can be larger. The profile of the microdrilled holes or vias 22 was measured using 3D laser scanning confocal microscope in this example as a Keyence VK-X1000 (Keyence) machine.

Figure 1B:
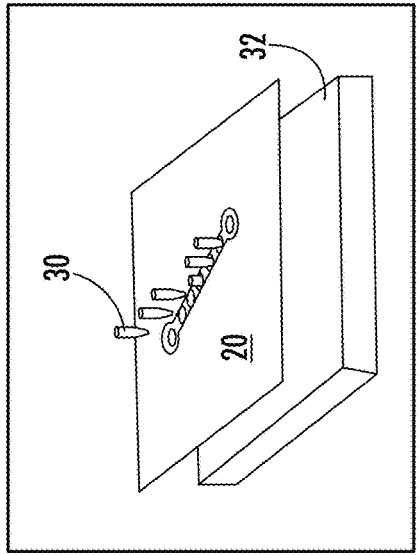
Figure 1C:
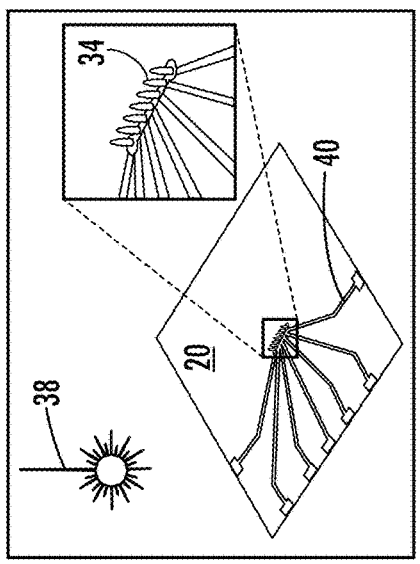

Hypodermic solid and hollow stainless steel microneedles 30 (32 G: ~230 μm) were magnetically inserted in this example from the bottom face 20a of the polycarbonate substrate 20 using the magnet 32 illustrated schematically in FIG. 1B. The microneedles 30 are inserted magnetically into the microdrilled holes. This step leads to the formation of the 3D microelectrodes 34 on the top face 20b (FIG. 1E). Microfluidic ports (FIG. 1F) may be defined at this step by switching out any solid microneedles 30 for a hollow port of the same or similar diameter. The length of the stainless steel microneedles 30 (2.3 mm in an example) may determine the height of the 3D hypodermic microneedle pin array forming the microelectrodes 34 as an array. The length of the hypodermic microneedles 30 may include the thickness of the polymer substrate 20. For a polycarbonate substrate 20 having a thickness of about 1.6 mm, the 3D hypodermic microneedle pin array as microelectrodes 34 has height of about 700 μm. To form the metal trace pattern 40 on the backside face 20a of the substrate 20, a shadow mask may be used. An ultraviolet laser tool, e.g., QuikLaze, may cut a Kapton® sheet, which is then aligned to the microdrilled vias in the polycarbonate substrate 20, followed by electron beam evaporation 38, resulting in 100 nm Ti/400 nm Au (gold) traces 40 as shown in FIG. 1C. Silver ink may be cast on the bottom side or face to seal and secure the 3D hypodermic microneedle pin array. Alternatively, the metallization process can be performed with micromilling traces and casting/curing silver inks.

Figure 1D:
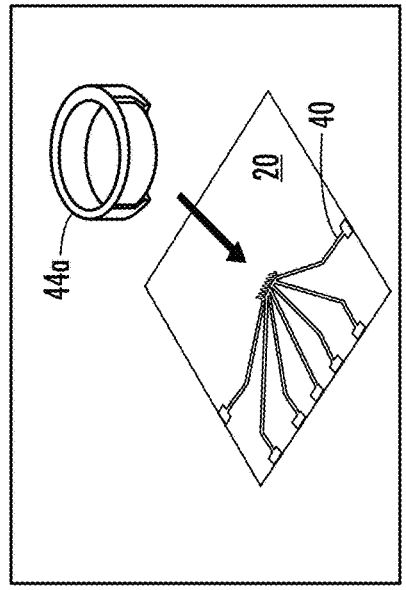
Figure 1E:
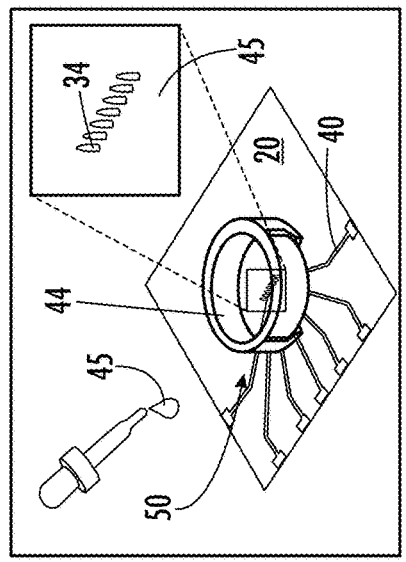
Figure 1F:
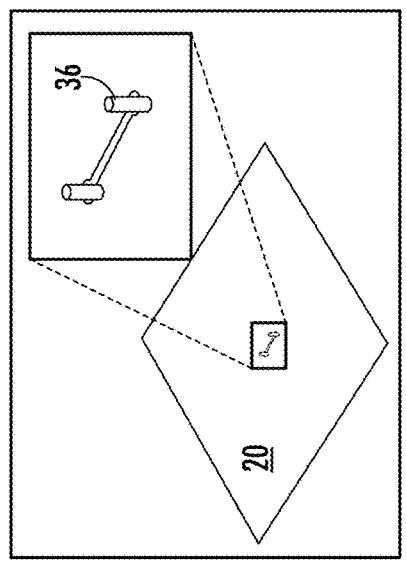

A culturing area (i.e., culture well) 44 may be formed in the top central portion of the 3D microelectrode array 34 by affixing a transparent polymer (PET-G) ring 44a using PDMS 45 as best shown in FIGS. 1D and 1E. A controlled and precise amount of the PDMS 45 may be drop-casted into the culturing area 44 and allowed to self-planarize. The volume of the PDMS 45 may control the thickness of the insulation inside the culture well 44 and thereby the height of the 3D hypodermic microneedle pin array 34 that forms the finalized 3D microelectrode array 50 with tri-modal capability as shown in FIGS. 1E and 4F. Referring now to FIG. 1F, there is shown how the microfluidic ports 48 may be alternatively assembled using the same process outlined above, without the electrical, functionalization steps.

For the electrical characterization of the polymer-metal 3D microelectrode arrays 50, the full spectrum impedance and the phase performance were probed using a two-channel Omicron Labs impedance measurement system, e.g., a Bode 100 device from Omicron Labs. These measurements were performed in the frequency range of about 10 Hz to 1 MHz with the microelectrodes 34 submerged in a saline/DPBS media and with the aid of a reference electrode.

A transparency assay was developed to validate the transparency of the different materials used when producing the 3D microelectrode array 50. In order to enable optical assessment of the cells, the transmittance of polycarbonate substrates 20 under different conditions with an average of N=3 materials for each condition was measured using a Cary WinUV Software operating on a Agilent Cary 300 ultraviolet spectrophotometer (Agilent). Measured substrates include glass slides as controls and having two thicknesses, 100 µm and 1 mm. The slides were cleaned for two days in a base bath of about 10% w/v $KOH/H_2O$+IPA (isopropanol), and then rinsed in a distilled water bath with N=3 pieces of polycarbonate after every process in the developmental cycle for impact on the transparency of polycarbonate at various stages.

Figure 2:
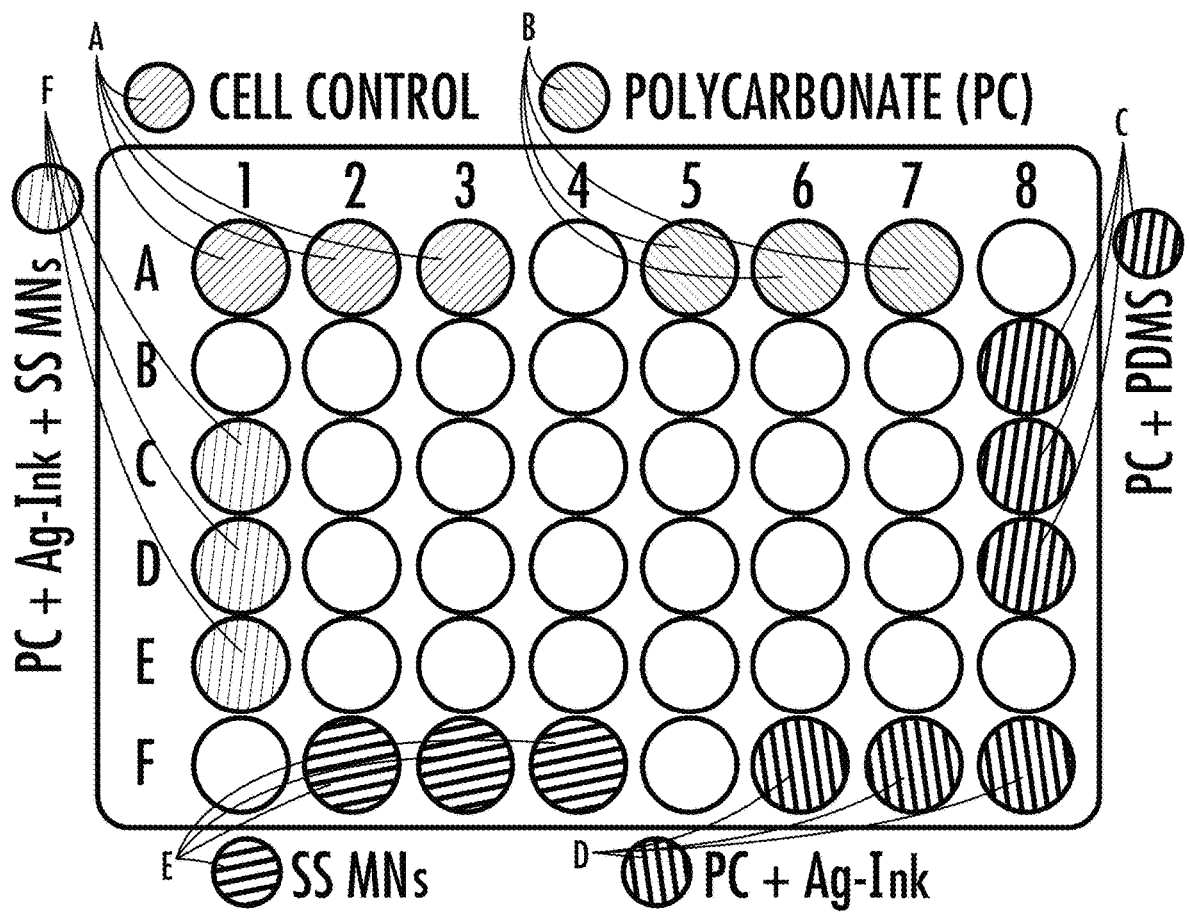
FIG. 2 is a schematic diagram of a 48-well plate biocompatibility assay.

The biocompatibility assay was conducted. In order to test the biocompatibility of all materials used in the microfabrication process, other than the gold (Au), a study encompassing all material combinations was prepared in a 48-well plate as shown in FIG. 2 where the different legends correspond to PC (polycarbonate), AG-Ink (gold ink), and SS (stainless steel) MNs (microneedles).

HL-1 cells were chosen for the electrogenic culture system. After initial thawing, HL-1 cells were cultured three days in vitro (DIV03) until reaching optimal confluency and observed using transmitted light microscopy (Nikon TS2). Each well was then plated with approximately 15,000 cardiomyocytes and monitored and maintained daily. Biocompatibility assay was performed at DIV08 (eight days) using an Invitrogen Live/Dead Cell Imaging Kit and recorded using a Keyence BZ-X800 All-in-One Confocal Microscope (Keyence) with emission and excitation wavelengths set at 525 nm and 470 nm, respectively.

Neural spheroids were prepared and individual spheroids were integrated with the microfluidic ports 48 by manually transferring the spheroid using a p2 micropipette and applying gentle suction under a stereoscope and continuing with Nerve-Chip fabrication and characterization to maintain in culture.

Figure 3C:
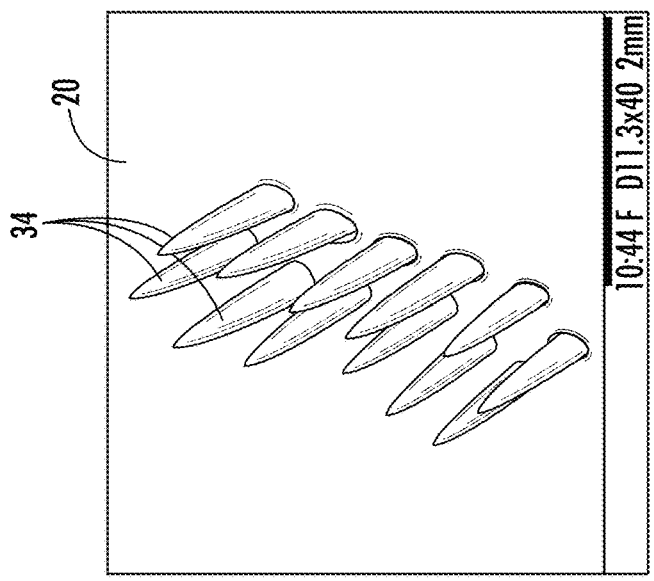
FIGS. 3A-3C are scanning electron microscope (SEM) images of inserted solid microneedles according to the invention.
Figure 3B:
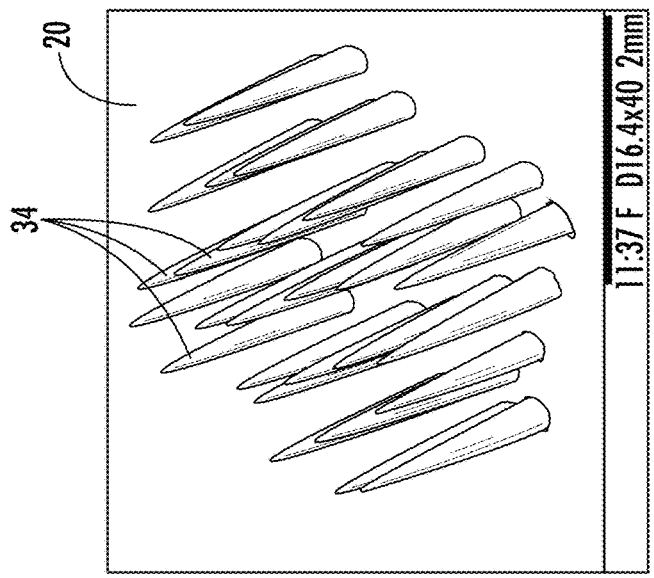
Figure 3A:
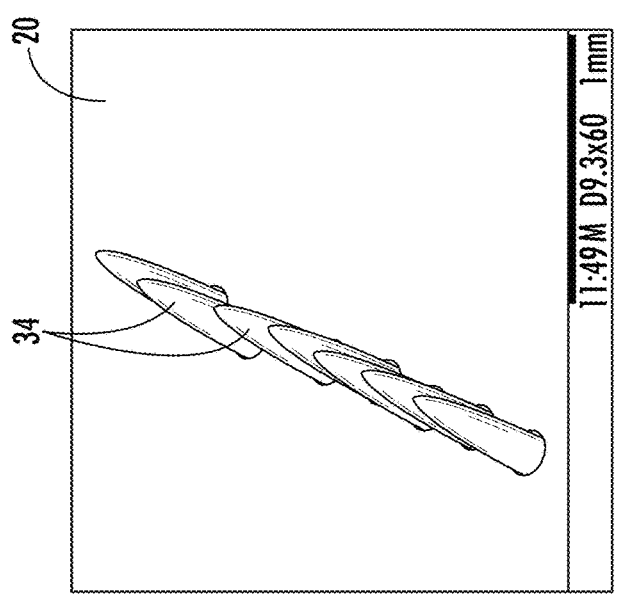

An important process in the development of the process was the combination of microdrilling and magnetic insertion of the microneedles 30 to form the microelectrodes 34. FIGS. 3A-3C show the flexibility and rapid customization of the process with 7, 28, and 12 3D microelectrodes 34 defined in linear (FIG. 3A), high density (FIG. 3B) and parallel (FIG. 3C) formats that may be used to probe a 3D Nerve-on-a-Chip® construct.

Figure 4A:
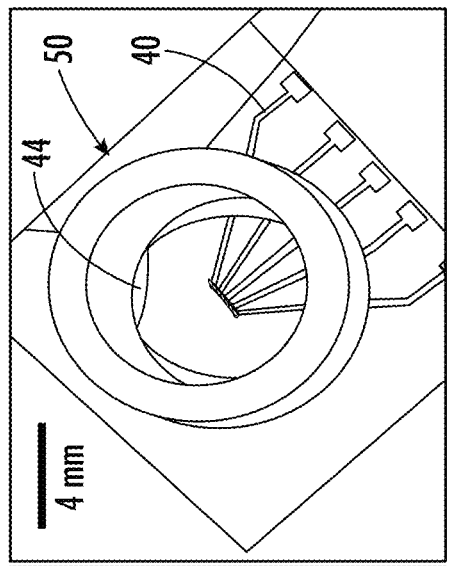
FIGS. 4A-4G show different components within the three-dimensional microelectrode array according to the invention.
Figure 4D:
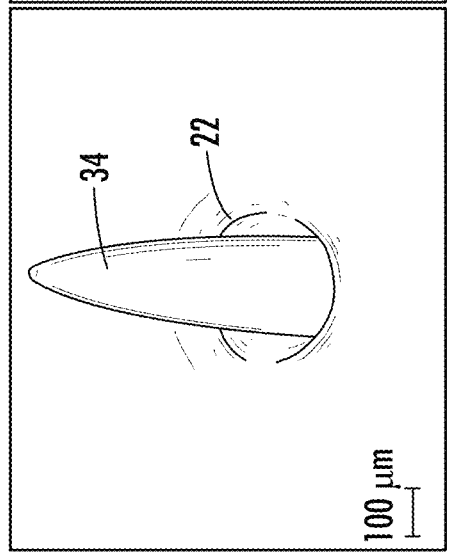
Figure 4F:
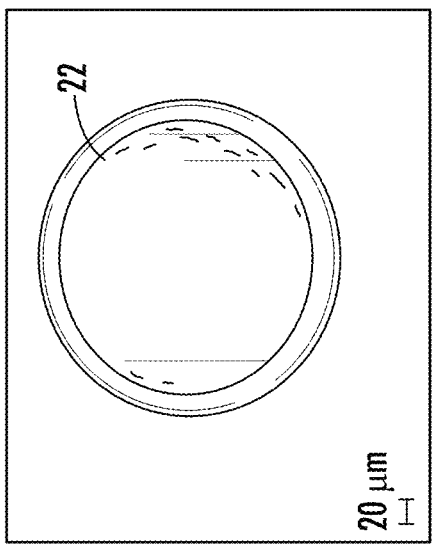
Figure 4B:
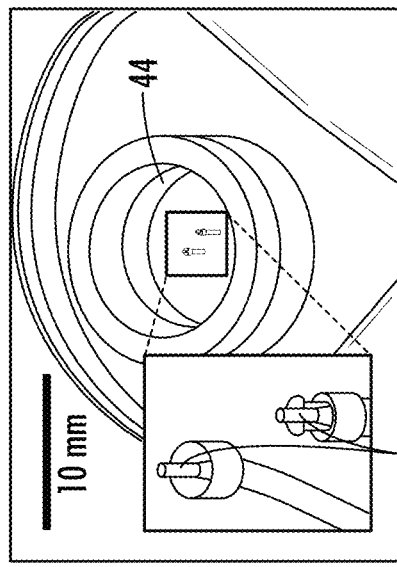
Figure 4C:
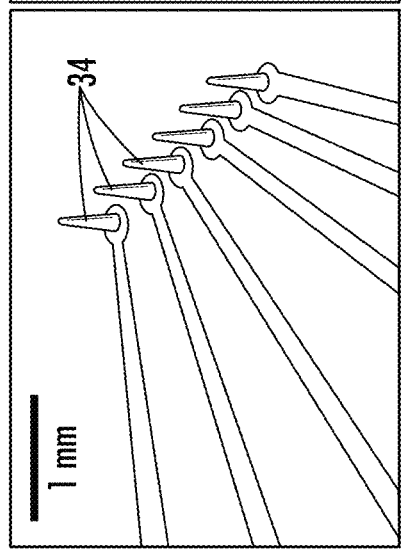
Figure 4E:
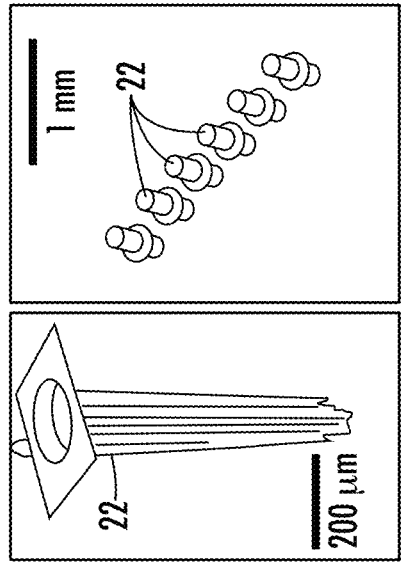
Figure 4G:
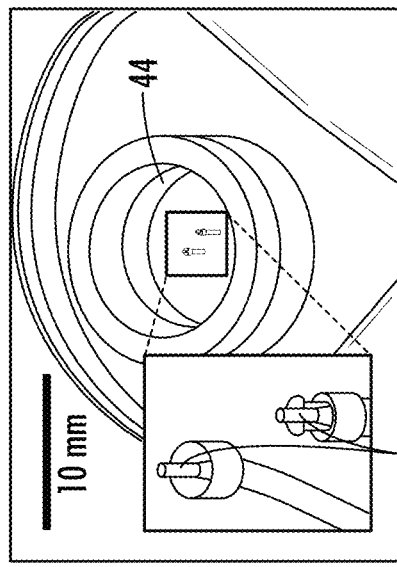

Referring now to FIGS. 4A-4G, there are illustrated different images showing the component integration for the 3D microelectrode array 50. FIG. 4A illustrates the scanning electron microscopy (SEM) image of an individual microdrilled via 22 achieved using the microdrilling optimization in a 1.6 mm thick polycarbonate substrate 20. FIG. 4B shows the confocal laser profiled image of a single microdrilled via 22 indicating the aspect ratio of the microdrilled holes. An optical micrograph of a linear array of the vias 22 is shown in FIG. 4C, followed by a scanning electron microscopic image of an individual single 3D microelectrode 34 in FIG. 4D. The magnetic insertion of six stainless steel 3D microelectrodes 34 in FIG. 4E. As shown in FIGS. 4F and 4G, the optical micrographs of the fully assembled 3D microelectrode array 50 shows in greater detail the culture well 44 having the PDMS insulation and the metal traces 40 shown in FIG. 4F and microfluidic ports 48 shown in FIG. 4G.

Figure 5:
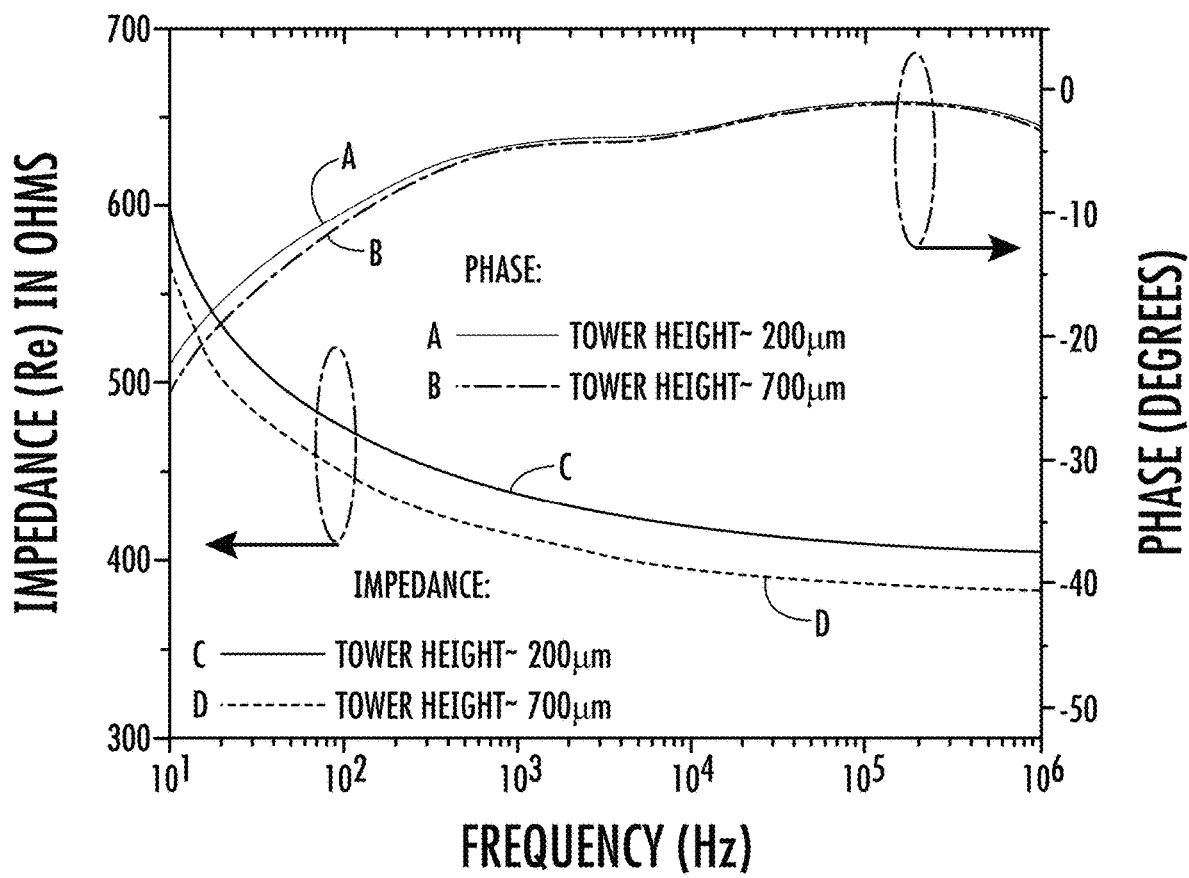
FIG. 5 is a graph showing the impedance and phase of the three-dimensional microelectrode array.

The impedance of the completed 3D microelectrode array 50 was characterized in an analysis. As shown in FIG. 5, full spectrum impedance and phase performance (N=3) of an integrated 3D microelectrode array 50 is shown. In an example, when employing the 3D electrode heights of 200 µm and 700 µm, electrode behavior demonstrates physiologically relevant 1 kHz values of 450Ω and 410Ω respectively, with reduced microelectrode size increasing the real part of the impedance. The phase of the 3D microelectrode array 34 may additionally represent classic microelectrode behavior that approaches solution resistance at high frequencies.

Figure 6:
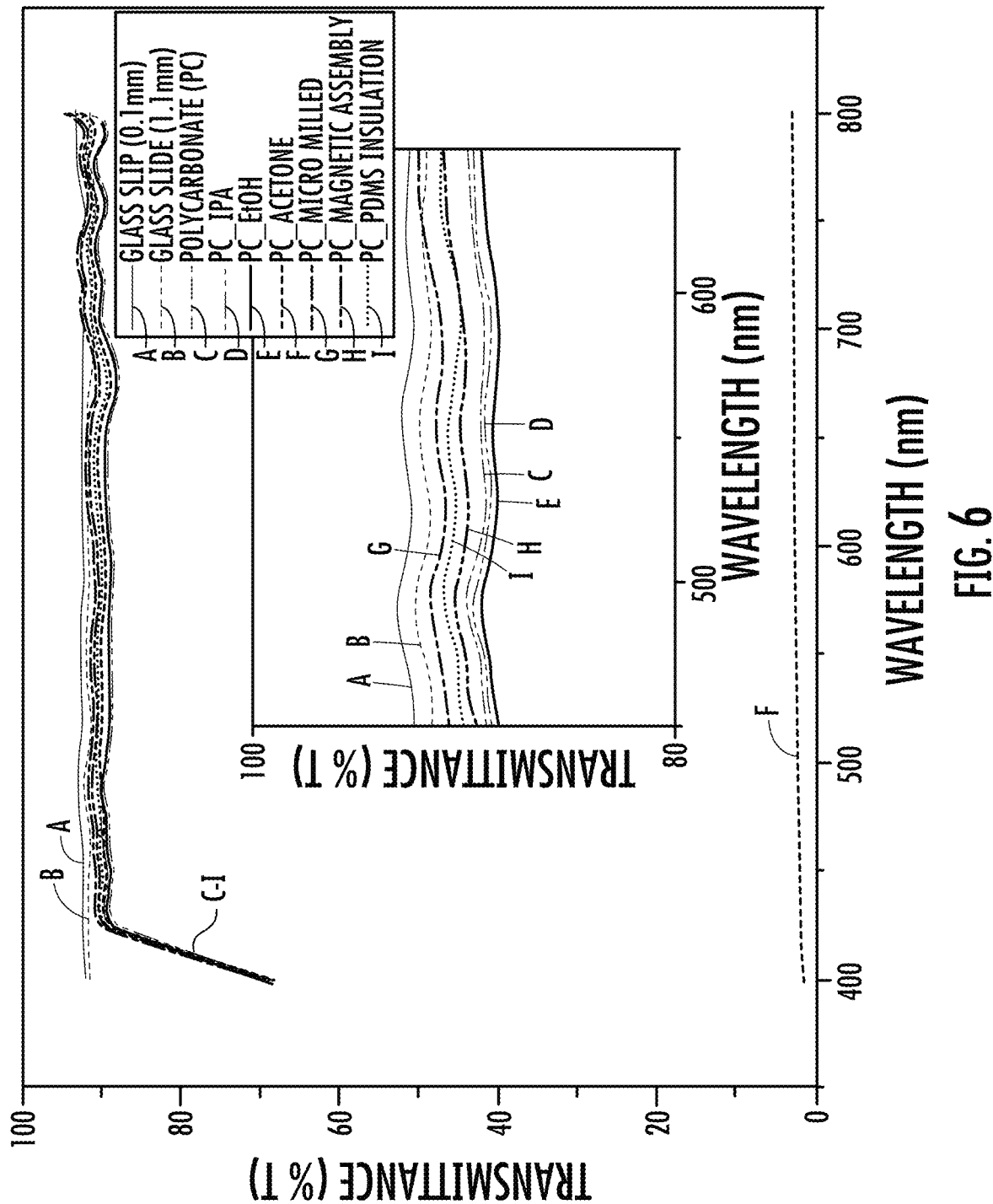
FIG. 6 is another graph showing an optical analysis of the polycarbonate substrate after chemical and mechanical processes to form the three-dimensional microelectrode array.

The graph of FIG. 6 shows transparency assay results. Glass substrates of 100 µm and 1 mm thickness were both assumed as positive control (92.68+/−1.41% and 91.81+/−1.30%, transmittance respectively) while the polycarbonate treated with acetone was assumed to be a negative control (2.65+/−0.48% transmittance), since acetone induces polymer crystallization resulting in an opaque visualization. As evident in the graph of FIG. 6, polycarbonate cleaned in either ethanol alcohol (EtOH) or isopropyl alcohol (IPA) showed no significant drop in transparency (88.81+/−4.12% and 89.16+/−4.11%) when compared to untreated polycarbonate (89.49+/−4.17%). Furthermore, the microdrilling followed by mechanical insertion of the microneedles as a mechanical process and PDMS casting on polycarbonate (91.53+/−4.30% and 90.72+/−4.28%) also presented no deleterious effect on transparency of the microelectrode array. The ultraviolet visible spectroscopy transparency measures are within a margin of error for transmittance. This unique assay further demonstrates that the processing does not introduce transparency issues, thus enabling optical modality of sensing for the 3D microelectrode arrays.

Figure 7B:
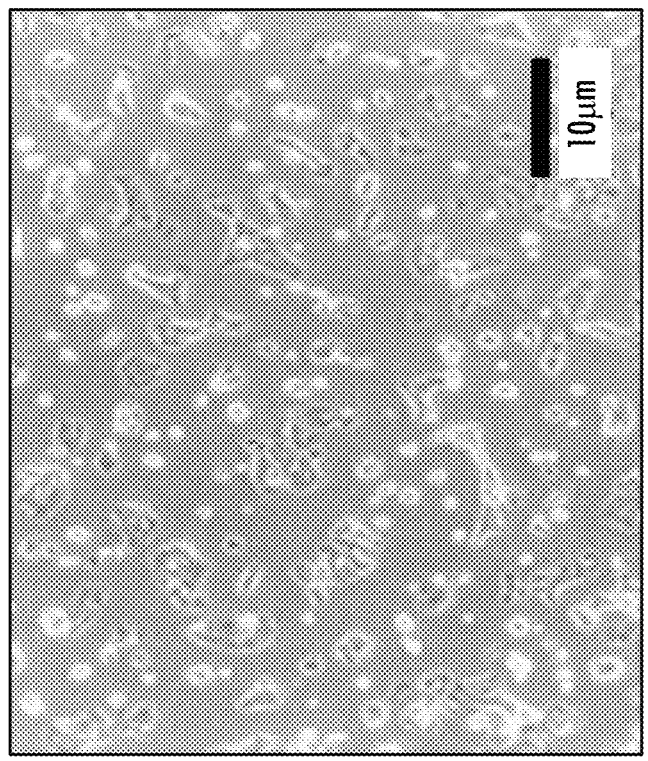
FIGS. 7A-7H are images showing the material biocompatibility assay analysis of the 3D microelectrode array.
Figure 7A:
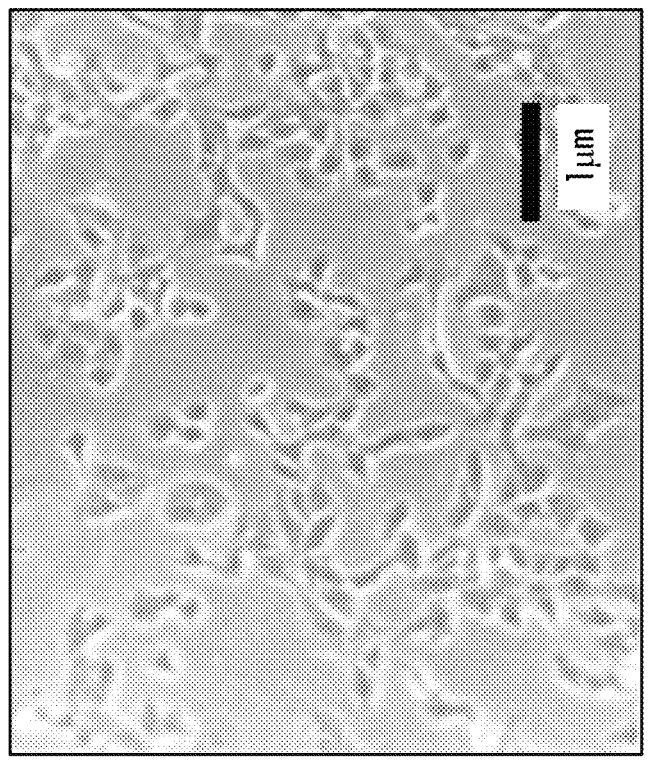
Figure 7C:
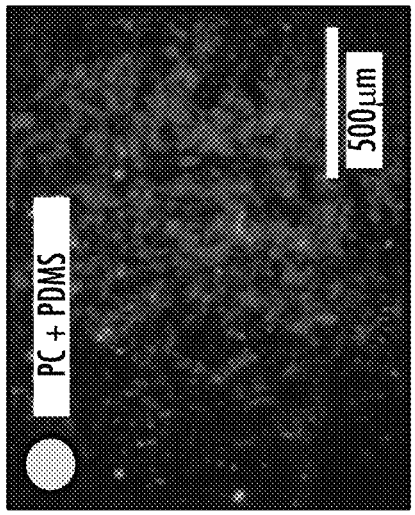
Figure 7D:
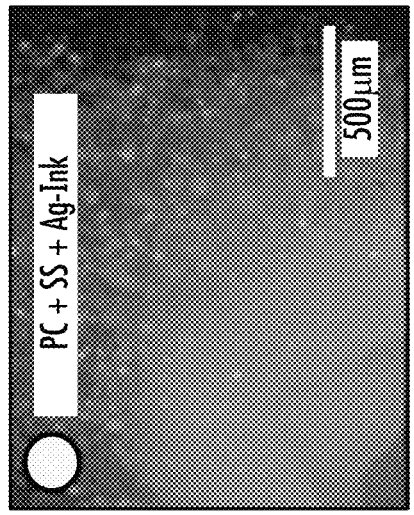
Figure 7E:
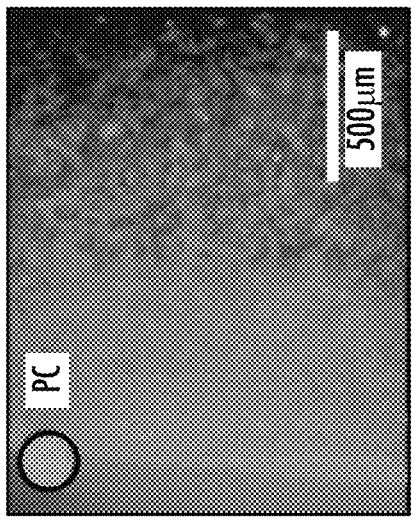
Figure 7F:
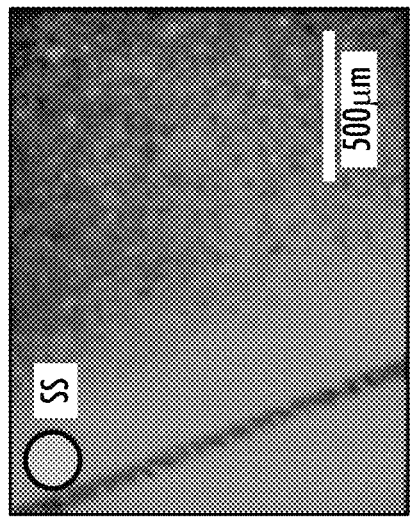
Figure 7G:
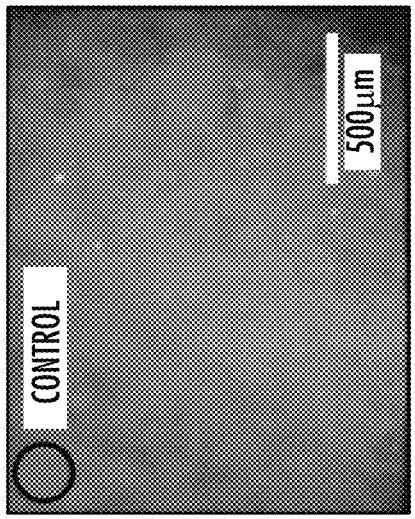
Figure 7H:
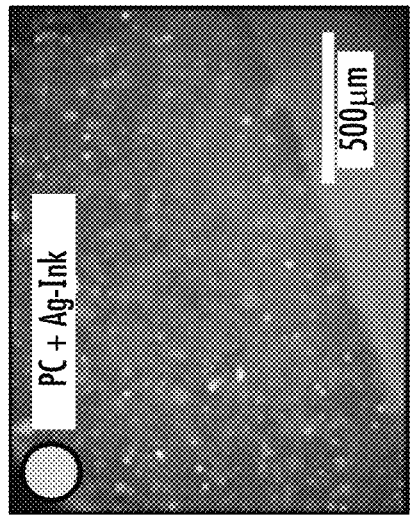

The images in FIGS. 7A-7H illustrate the results for the material assay biocompatibility. Prior to cell plating, in vitro confluency was reached for HL-1 cells as shown in the images of FIGS. 7A and 7B, and a cell control is shown in FIG. 7C. Expected cell growth was observed for all materials and live/dead fluorescence imaging of the HL-1 cells showed excellent viability on a polycarbonate substrate with PDMS insulation, and stainless steel electrode sets as shown in FIGS. 7D, 7E and 7G, where the cells were cultured in direct contact. The wells with Ag-ink as shown in FIGS. 7F and 7G present less desirable viability, indicating that further investigation may be required.

Figure 8B:
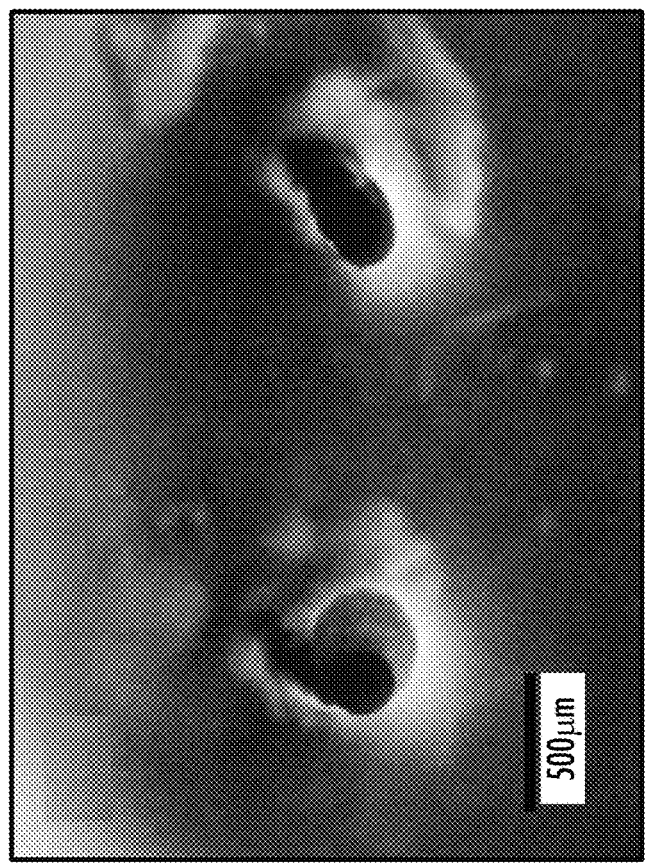
FIGS. 8A and 8B are images showing the neural spheroids on microfluidic ports for the 3D microelectrode array.
Figure 8A:
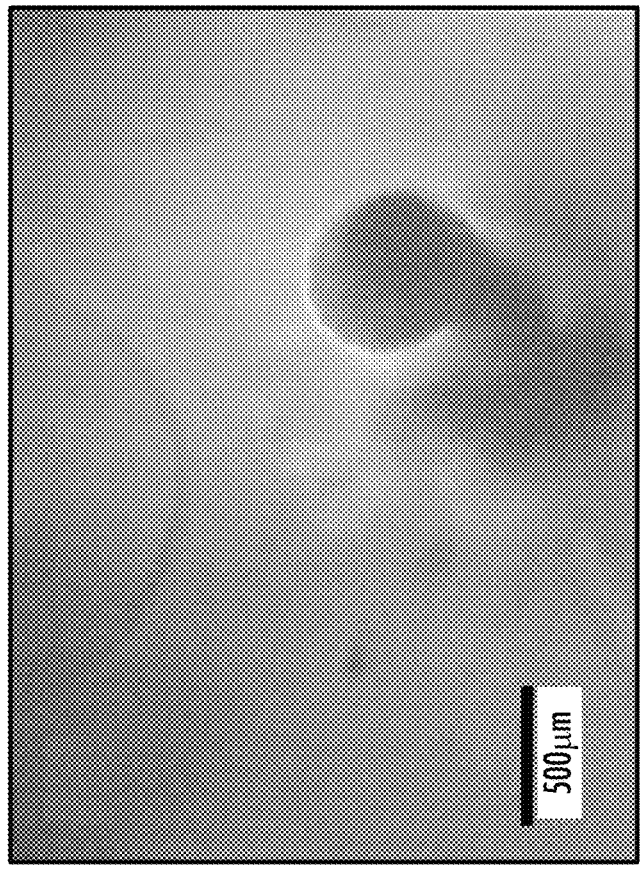

Spheroids were encapsulated within the Nerve-on-a-Chip® as shown in the images of FIGS. 8A and 8B, and observed over one week to ensure they did not detach from the microfluidic port 48. This preliminary trial opened areas to explore as directed to 3D neural outgrowth coupled with long-term assessment of electrophysiology and localized drug delivery via the microfluidic ports.

It is evident that in vitro 3D microelectrode arrays 34 permit a sensing and interfacing role in the rapidly growing field of organs-on-a-chip. This polymer-metal 3D microelectrode array technology was developed for tri-modal interfacing with electrogenic cellular constructs. Future development may include electrophysiological recordings and investigation of drug and toxin response.

As shown in the process of FIGS. 1A-1F, a three-dimensional (3D) microelectrode array 50 for in vitro electrical, optical and microfluidic interrogation of electrogenic cell constructs includes a substrate 20 having a top face 20b and opposing bottom face 20a and a plurality of micro vias 22 formed within the substrate and extending from the bottom face to the top face. A plurality of solid hypodermic microneedles 30 are received within a first set of the micro vias 22 and extend upward from the bottom face 20a through the top face 20b of the substrate 20 and have a length that exceeds the thickness of the substrate to form a hypodermic microneedle array as microelectrodes 30 on the top face. Microtroughs may be formed on the bottom face and interconnect the first set of micro vias, and have conductive paste received therein forming a conductive metal trace pattern 40 interconnecting the hypodermic microneedles.

The substrate 20 may be formed of polycarbonate as noted before, and the length of the hypodermic microneedles 30 may be about 1.3 to 1.6 times greater than the thickness of the substrate. The substrate 20 may be about 500 µm to 5.0 mm, and in another example, about 1.4 mm to 1.8 mm thickness. The height of the microneedle array may extend above the top face of the substrate about 25 µm to 5.0 mm, and in another example, about 100 µm to 900 µm. In another example, a culturing area 44 as a culture well may be formed in the top face as a ring of transparent polymer such as polyethylene terephthalate glycol (PET-G) in a non-limiting example. The culturing area may include a self-planarized polydimethylsiloxane layer. The microfluidic ports may interconnect the culturing area and formed culture wells therein.

Further details are now set forth for the 3D microelectrode array 50 as described above. The 3D microelectrode array may stimulate and record down the length of an engineered neuronal axonal fiber tract while maintaining optical clarity. In an example, the 3D microelectrode arrays may be designed with AutoCAD 2020 (Autodesk, San Francisco, California, USA) on a 24 mm×24 mm chip size and on a 30 mm×30 mm chip size. These variations were due to the recording and stimulation amplifier limitations.

One of the applications of this bio-interfacing 3D microelectrode array is the in vitro stimulation and recording of neuronal systems enabling multimodal probing capabilities that will ensure both electrophysiological and optical tracking of these cellular constructs as they mature. As an example, the neuronal system being targeted in this example may be dorsal root ganglion (DRG) sensory neuron spheroids and dorsal horn (DH) sensory neuron spheroids. In order to accommodate the need to stimulate DRG and DH sensory neuron spheroids and record sensory axons growing towards the dorsal spinal neuron spheroids, the constraints of the design in this example created a 3D microelectrode array with microfluidic ports within a 2 mm linear array having a 400 µm sphere on each ending, similar to a dumbbell. Additionally, each electrode area as accounted for the microdrilled (µD) vias was about 220 µm in diameter.

In this example, the 3D microelectrode array formfactor that fits in an Axion BioSystems single well microelectrode array muse system amplifier control unit for signal processing is a 24 mm×24 mm×1.6 mm polycarbonate. Contact pads were designed to be 1.5 mm×1.00 mm.

A 24×24 mm polycarbonate substrate with a culturing area in the top central portion of the device was defined by the 15 mm inner diameter transparent polymer (PET-G) ring in this example. Another feature was the 1.5×1.0 mm contact pads at the outer border of the device, ensuring interface connection for recording/stimulating of electrodes. Different densities of electrodes may be formed in the linear array format such as 7, 6, and 5, respectively. If there is a 2 mm length dumbbell outline restriction, seven (7) is the maximum number of 220 µm diameter electrodes able to fit with the minimum 110 µm distance between them. If density is reduced to six (6) 220 µm diameter electrodes, the distance between them is limited to 180 µm. If density is reduced to five (5) 220 µm diameter electrodes, the distance between them is 280 µm. The traces to connect the 3D microelectrodes to bond pads at the periphery of the chip may be about 200 µm in width and varying lengths.

Considering a 2 mm length dumbbell outline restriction, two different densities of electrodes in the array format around the dumbbell construct may be formed instead of a linear array through the dumbbell: 12 and 16 electrodes, respectively. It is possible to have twelve 220 µm diameter electrode configuration with 250 µm and 60 µm distances, and 50 µm distance between electrodes on the two outer circles of the dumbbell. The traces to connect the 3D microelectrodes to bond pads at the periphery of the chip may be about 150 µm in width and varying length.

It is possible to have 28 220 µm diameter electrodes inside a star shaped geometry, where the central electrodes may be about 640 µm apart from center to center, with a 420 µm distance between them. The edge electrodes may be about 318 µm apart from center to center, with a 98 µm distance between them as non-limiting examples. These values may all vary from 5%, 10%, 15% and 20%. The point-to-point distance of the star-shaped geometry may be about 6 mm with an arc length of about 3.5 radians. The Axion BioSystems MUSE hardware is able to connect up to 64 2D or 3D microelectrodes for stimulation and recording.

It is possible to use a custom manual system to better control devices and constructs. For example, the design files may be modified to a 30 mm×30 mm×1.75 mm polycarbonate substrate that also allows for customization and flexibility of microelectrode arrays designs. It is possible for the main recording electrode and one reference electrode be about 5 mm apart, and two stimulating electrodes that are about 2 mm from the recording electrode. These electrodes may be about 220 µm in diameter and approximately 150 µm above the surface of the culture well.

It is possible to microraster the contact pads to allow for better attachment and connection of the microelectrode array to any system controller. Different tools may be used for microdrilling (machining) holes to form vias. A DB-0083 tool may be used as a 135° English Carbide Drill Bit with a web thickness (WT) of 85 µm, two cutting lips (CL), and margin (M) of 300 µm. It is a two flute drill bit where the extreme end of the web forms the chisel edge and a chisel edge angle of y=125°. The angle between the cutting lips approximates into a point angle of about θ=135°. The body length of the tool measures about 3.20 mm, and the neck length of the tool is about 1.2 mm with a neck diameter of 1 mm. The overall length of the tool is about 36 mm with a shank length of about 31.6 mm and shank diameter of about 3.175 mm. The tip length may be about L=115 μm and the drill diameter may be about 200 μm. Possible microdrilling parameters are set forth below in Table 1.

TABLE 1

| FEED RATE (mm/sec) | DEPTH OF CUT (mm) | PRESSURE (psi) | SPINDLE SPEED (rpm) |
|---|---|---|---|
| 10 | 2 | 10 | 60,000 |
|  |  | 15 |  |
|  |  | 20 |  |
| 15 |  | 10 |  |
|  |  | 15 |  |
|  |  | 20 |  |
| 20 |  | 10 |  |
|  |  | 15 |  |
|  |  | 20 |  |
| 25 |  | 10 |  |
|  |  | 15 |  |
|  |  | 20 |  |

In an example, the microdrilled vias were formed using a DB 0083 Tool (T Tech, Peachtree Corners, GA, USA) that was spun at 60,000 rpm to cut into a polycarbonate sheet such as from McMaster-Carr, Santa Fe Springs, CA, USA. The feed rate was varied between 10, 15, 20, and 25 mm/s with a depth of cut of about 2 mm. The pressure applied upon the substrate was about 10, 15, and 20 psi. The polycarbonate substrate was subsequently treated in a solution of 25% isopropyl alcohol at 35° C. for 10 minutes with sonication to remove debris from the microdrilling process. Scanning Electron Microscope (SEM) imaging was performed using JSM 6480 (JEOL, Peabody, MA, USA).

To ensure that the axial engagement of tool was accomplished, a pressure foot was used to hold the polycarbonate substrate in place while the milling tool micro-machined the desired geometry. Over-engaging with the substrate may cause the width of cut to be too high, whereas under-engaging with the substrate may cause the width of cut to vary. The pressure foot was adjusted to apply a pressure in the range of 0-99 psi on the substrate. If the applied pressure is at the lower end (8-10 psi), the substrate may move while the microdrilling process is in progress, causing the formation of distorted geometries. On the contrary, if the applied pressure is too high (>40 psi), slight changes in the depth of cut may result in either the microdrilling tool over-engaging or under-engaging with the substrate.

It was found that the larger the depth of cut for the microchannels, the wider the resultant microchannel. Precise control of the depth of cut is preferred since axial engagement of the tool should be maintained at values lower than the thickness of the polycarbonate substrate for the creation of μM channels for ink casting of traces. In one example, process conditions of the spindle speed (60,000 rpm), feed rate (20 mm/s), depth of cut (200 μm) and pressure foot settings (15 psi) resulted in the desired geometry.

For the fabrication of the micromechanical channels, a T-8 Tool (T-Tech, Peachtree Corners, GA, USA) was spun at 60,000 rpm to cut into the polycarbonate sheet (McMaster-Carr, Santa Fe Springs, CA, USA). The feed rate was varied between 20 and 25 mm/s with a depth of cut about 0.5. The pressure applied upon the substrate was 15 psi. The polycarbonate substrate was subsequently treated in a solution of 25% isopropyl alcohol at 35° C. for 10 minutes with sonication. Scanning Electron Microscope imaging was performed using JSM 6480 (JEOL, Peabody, MA, USA).

The 3D stainless steel tapered microneedles were cut to size to control the size of the 3D electrodes used in the microelectrode array. The length of the microneedles in an example were about 2.3 mm. For a polycarbonate substrate having a thickness of about 1.6 mm, the 3D pin needle array has a height of about 700 μm. It was possible to laser scribe and then cut such as with a paper cutter. For the laser scribing, 10× microneedles may be aligned, securely taped together, and aligned under the QuikLaze 50 ST2, Neodymium-doped Yttrium Aluminum Garnet (Nd:YAG; Nd:Y3A15O12) laser micromachining system (Eolite Lasers, USA). Infrared (IR) light (1064 nm wavelength) may be used for the stainless steel ablation with 6 mJ power and 50 Hz repetition rate at 95% output. It is possible to laser cut in six passes at 30 μm/sec scanning speed. It is possible for the 10-microneedle pack to be aligned and microneedles to be cut in a single step. The microneedles measured 2.3 mm in height with a Standard Deviation of +/−50 μm.

The magnet for magnetic insertion of microneedles may be a 45×20×10 mm N52 neodymium magnet. The cut microneedles are carefully aligned under a stereoscope. Microfluidic ports may be defined at this step by switching out the solid needle for a hollow port of the same diameter. The length of the hypodermic microneedles may include the thickness of the polymer substrate as the magnetic insertion is performed from the bottom side of the polymer and the hypodermic pin array protrudes out of plane only in the top side of the substrate. Silver-ink (Epo-Tech, USA) may be used to fill the vias, and secure the microelectrode microneedles in place. The silver ink step is optional for the 3D microfluidic ports.

It is possible to use gold (Au) metallization for the metal trace pattern on the backside of the substrate. A shadow mask was designed and laser micromachined from thin Kapton® (12.5 μm) sheets (DuPont™, USA) utilizing the QuikLaze 50 ST2, Neodymium-doped Yttrium Aluminum Garnet (Nd:YAG; Nd:Y3A15O12) laser micromachining system (Eolite Lasers, USA) ultraviolet (UV) light at 355 nm wavelength in two passes at 70 μm/sec scanning speed, 3.6 mJ power with 100% output, and 50 Hz repetition rate. The thin and precise shadow mask containing traces and contact pads openings were subsequently aligned to the microdrilled vias in the substrate. The substrate was plasma treated with oxygen plasma to ensure a material modification to a hydrophilic state that aids in the adhesion of the metal layer to the polymer surface. To define the metal layer atop this substrate, titanium (Ti; 4N5 purity pellets) and gold (Au; 5N purity pellets) (Kurt J. Lesker, USA) were deposited by electron-beam (E-beam) evaporation (Thermionics Laboratory Inc., USA) through the laser micro-machined shadow mask on the substrate. The Ti and Au layers were deposited at a vacuum of 5.0×10−6 Torr, with layer thicknesses of 100 nm (Ti) and 400 nm (Au) respectively. Deposition rates for this process were 2.0 nm/s (Ti) and 5.0 nm/s (Au) respectively.

Microchannels or microtroughs were micromilled on the back of the substrate with 750 μm width and 500 μm depth dimensions. Metallization was performed on these microchannels by casting Epo-tek® EJ2189 silver-ink (Epo-Tech, USA), into the cutouts and the ink was cured at 60° C. for 24 hours to achieve a mechanically robust profile. After curing, the excess ink was removed using isopropyl alcohol, leaving behind only the ink in the microchannels. Both strategies for metallization were pursued during the course of this project.

The culturing area in the top central portion of the device was defined by affixing a transparent polymer (PET-G) ring with defined OD=19 mm and ID=15 mm using polydimethylsiloxane (PDMS). The PET-G ring was fabricated by cutting an 8-feet long clear impact-resistant PET-G tubing (McMaster-Carr, Santa Fe Springs, CA, USA) into smaller heights of approximately 5 mm. With a 15 mm diameter culture well, addition of a precise volume of 0.085 g of PDMS, an insulation thickness of about 500 μm inside the culture well area is achieved, thereby rendering a height of ~200 μm for the 3D hPA or the 3D MEA at this stage. Calculations were done based on PDMS density $\rho=0.965$ g/mL.

$$A=\pi r^2 \; A=\pi(7.5)^2 \; A=176.71 \text{ mm}^2 \qquad (i)$$

$$V=Ah \; V=176.71\times 0.5 \; V=88.35 \text{ mm}^3 \qquad (ii)$$

$$0.08835 \text{ mL} \times 0.965 = 0.085 \text{ g} \qquad (iii)$$

A controlled and precise amount of the PDMS was drop-casted into the culturing area and allowed to self-planarize. The volume of the PDMS controls the thickness of the insulation inside the culture well and thereby the height of the 3D microelectrode array. Two different volumes were chosen to target multiple heights of the Tri-Modal microelectrode arrays. The device assembly were cured at 50° C. for an additional 24 hours to maintain the full cross-linked mechanical properties of the PDMS. A conformal layer of PDMS uniformly coated the 2D and 3D regions inside of the culture well giving a culture ready device compatible with commercial amplification systems.

Alternatively, spin-coating of PDMS was also performed for achieving a conformal layer of PDMS on the final 3D microelectrode array. For the spin-coating technique, the PDMS was dispensed inside the culture well and coated at 6000 rpm for 60 seconds. Other materials may be used, including SU-8 insulation, polystyrene, silicon dioxide, and other similar materials.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A three-dimensional (3D) microelectrode array for in vitro electrical and microfluidic interrogation of electrogenic cell constructs, comprising:
   a substrate having a top face and opposing bottom face;
   a plurality of micro vias formed within the substrate and extending from the bottom face to the top face;
   a hypodermic microneedle received within each micro via of a first subgroup of the plurality of micro vias and extending upward from the bottom face through the top face and having a length that exceeds the thickness of the substrate to form a hypodermic microneedle array on the top face;
   metallic traces formed on the bottom face and interconnecting the hypodermic microneedles to form the 3D microelectrode array; and
   a culturing area formed in the top face.

2. The 3D microelectrode array of claim 1 comprising microtroughs formed on the bottom face and interconnecting the micro vias of the first subgroup, and having conductive paste received therein forming a metallic trace pattern interconnecting the hypodermic microneedles.

3. The 3D microelectrode array of claim 1 comprising a plurality of hollow hypodermic microports received within a second subgroup of the plurality of micro vias and extending upward from the bottom face and forming microfluidic ports.

4. The 3D microelectrode array of claim 1 wherein said hypodermic microneedles comprise at least one of solid and hollow microneedles.

5. The 3D microelectrode array of claim 1 wherein the length of the hypodermic microneedles is about 1.3 to 1.6 times greater than the thickness of the substrate.

6. The 3D microelectrode array of claim 1 wherein the substrate is about 500 μm to 5.0 mm in thickness.

7. The 3D microelectrode array of claim 1 wherein the height of the microneedle array extending above the top face of the substrate is about 25 μm to 5 mm.

8. The 3D microelectrode array of claim 1 wherein said culturing area comprises a ring of transparent polymer.

9. A three-dimensional (3D) microelectrode array for in vitro electrical and microfluidic interrogation of electrogenic cell constructs, comprising:
   a polycarbonate substrate having a top face and opposing bottom face;
   a plurality of micro vias formed within the substrate and extending from the bottom face to the top face;
   a hypodermic microneedle received within each micro via of a first subgroup of the plurality of micro vias and extending upward from the bottom face through the top face and having a length that is about 1.3 to 1.6 times greater than the thickness of the substrate to form a hypodermic microneedle array on the top face, wherein the height of the microneedle array extending above the top face of the substrate is about 25 μm to 5 mm;
   a plurality of hollow hypodermic microports received within a second subgroup of the plurality of micro vias and extending upward from the bottom face and forming microfluidic ports;
   metallic traces formed on the bottom face and interconnecting the hypodermic microneedles; and
   a culturing area formed as a ring of transparent polymer in the top face and having an insulation layer.

10. The 3D microelectrode array of claim 9 comprising microtroughs formed on the bottom face and interconnecting the first subgroup of micro vias, and having conductive paste received therein forming a metallic trace pattern interconnecting the hypodermic microneedles.

11. The 3D microelectrode array of claim 9 wherein said hypodermic microneedles comprise at least one of solid and hollow microneedles.

12. The 3D microelectrode array of claim 9 wherein the substrate is about 500 μm to 5.0 mm in thickness.

13. The 3D microelectrode array of claim 9 wherein said ring of transparent polymer comprises polyethylene terephthalate glycol (PET-G).

14. A method of forming a three-dimensional (3D) microelectrode array for in vitro electrical, optical and microfluidic interrogation of electrogenic cell constructs, comprising:
   forming a substrate having a top face and opposing bottom face;
   forming a plurality of micro vias within the substrate from the bottom face to the top face;
   inserting a hypodermic microneedle within each micro via of a first subgroup of the plurality of micro vias and that extend upward from the bottom face through the top face and having a length that exceeds the thickness of the substrate to form a hypodermic microneedle array on the top face;

forming metallic traces on the bottom face that interconnect the hypodermic microneedles; and forming a culturing area in the top face.

15. The method of claim 14 comprising forming microtroughs on the bottom face that interconnect the micro vias, and inserting conductive paste within the microtroughs to form a metallic trace pattern interconnecting the hypodermic microneedles.

16. The method of claim 14 comprising forming a hollow hypodermic microport within each micro via of a second subgroup of the plurality of micro vias and that extend upward from the bottom face to form microfluidic ports.

17. The method of claim 14 wherein the hypodermic microneedles comprise at least one of solid and hollow microneedles.

18. The method of claim 14 wherein the length of the hypodermic microneedles is about 1.3 to 1.6 times greater than the thickness of the substrate.

19. The method of claim 14 wherein the substrate is about 500 µm to 5.0 mm in thickness.

20. The method of claim 14 wherein the height of the microneedle array extending above the top face of the substrate is about 25 µm to 5.0 mm.

21. The method of claim 14 wherein the culturing area comprises a ring of transparent polymer.

* * * * *